United States Patent [19]

Osujo

[11] Patent Number: 4,571,786
[45] Date of Patent: Feb. 25, 1986

[54] CHANGE-SPEED MANEUVERING APPARATUS INCORPORATED IN A VEHICLE

[75] Inventor: Masahide Osujo, Sennan, Japan

[73] Assignee: Kubota, Ltd., Japan

[21] Appl. No.: 543,097

[22] Filed: Oct. 18, 1983

[30] Foreign Application Priority Data

Jun. 15, 1983 [JP] Japan .................. 58-92446

[51] Int. Cl.⁴ ........................................... G05G 11/00
[52] U.S. Cl. ...................................... 74/485; 74/486; 180/78
[58] Field of Search ............. 74/473 SW, 484 R, 485, 74/486; 180/78, 336

[56] References Cited

U.S. PATENT DOCUMENTS

| | | | |
|---|---|---|---|
| 994,428 | 6/1911 | Schmidt | 74/485 |
| 1,229,865 | 6/1917 | Bates | 74/485 |
| 1,494,355 | 5/1924 | Hawley | 74/485 |
| 2,248,364 | 7/1941 | Leach | 74/485 |
| 2,320,878 | 6/1943 | Manning | 74/485 |
| 2,658,409 | 11/1953 | Hughes | 74/484 |
| 2,855,797 | 10/1958 | Dunn, Jr. | 74/484 |
| 3,354,981 | 11/1967 | Swanson et al. | 180/336 X |
| 3,760,643 | 9/1973 | Allison et al. | 74/484 X |

*Primary Examiner*—William E. Tapoloai
*Attorney, Agent, or Firm*—Kane, Dalsimer, Kane, Sullivan and Kurucz

[57] ABSTRACT

A change-speed maneuvering apparatus in a vehicle provided with a steering-wheel apparatus including a generally upright steering-wheel post, has a main change-speed maneuvering shaft assembly on one lateral side of the steering-wheel post, in parallel to it. On the other lateral side of the steering-wheel post, there is, also in parallel to it, a forward-and-rearward running-travel shiftover actuation shaft, and there also are interlocking levers which are pivotally supported on the forward-and-rearward running-travel shiftover shaft and which function to operatively connect the main change-speed maneuvering shaft to the drive power transmission mechanism.

10 Claims, 13 Drawing Figures

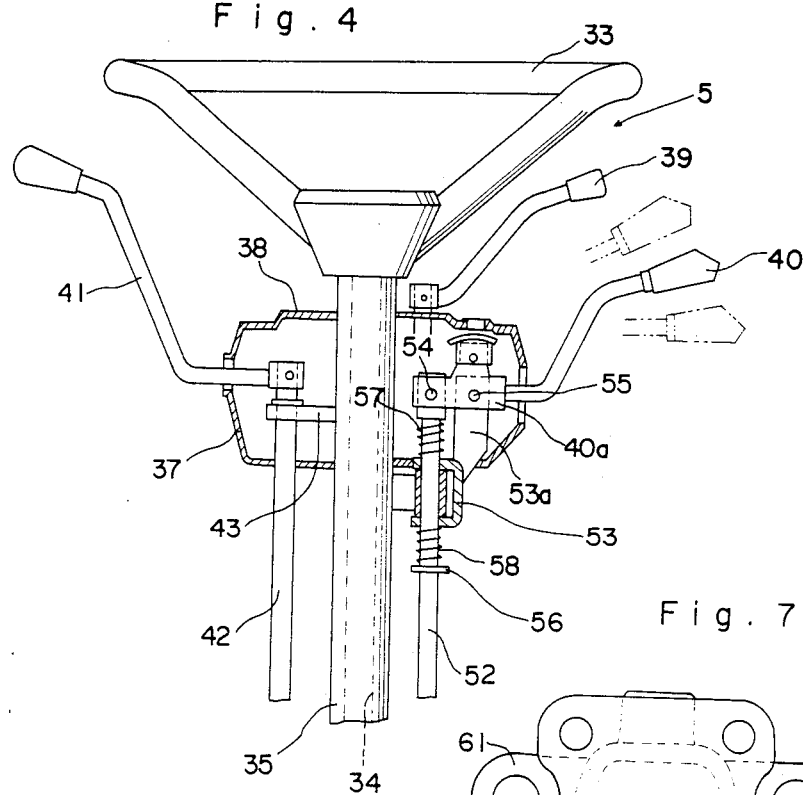
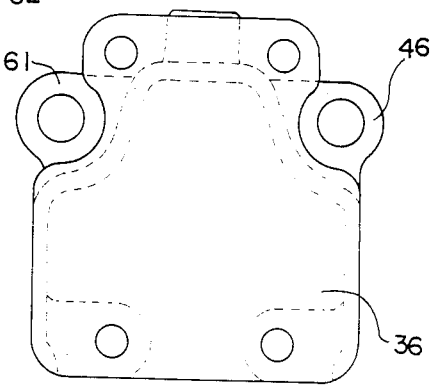

CHANGE-SPEED MANEUVERING APPARATUS INCORPORATED IN A VEHICLE

BACKGROUND OF THE INVENTION

This invention relates to a change-speed maneuvering apparatus incorporated in a vehicle such as a tractor or the like.

There conventionally are vehicles, for instance tractors, each of which are provided, on its vehicle body, with an upright steering-wheel apparatus and on righthand and lefthand sides of and along the steering-wheel apparatus further with an upright main change-speed maneuvering shaft and an actuation shaft for forward-and-rearward running-travel shiftover, wherein the main change-speed maneuvering shaft is operatively connected to a main change-speed apparatus within a transmission case via interlocking means including levers which are maneuvered in rocking rotation on the lefthand side of a lower portion of the steeringwheel apparatus.

It has been the practice, with such conventional construction, to fixedly provide a bracket or brackets on the lefthand side of the lower portion of the steering-wheel apparatus, and to support the interlocking levers, for free rocking rotation, and on a shaft or shafts mounted on the bracket(s), and it has so far been keenly desired to reduce the number of the component parts like the brackets, shafts and so forth.

The support structure as above has also another problem in that it is there required to dispose the interlocking levers and the bracket(s) outwardly apart from the lower portion of the actuation shaft, in order thus to avoid interference with the actuation shaft, and therefore that the portions of the main change-speed maneuvering apparatus and the forward-and-rearward running-travel shiftover maneuvering apparatus, that are around the lower portion of the steeringwheel apparatus, can not be arranged completely close to each other, thus to result in a messy condition.

Besides, it has as well so far been desired to provide effective operative interlocking means for incorporating a so-called shuttle-transmission structure capable of effecting the speed changing in the same step number in either of forward and rearward running travels, while retaining the construction of disposing the main change-speed lever and the forward-andrearward running-travel shiftover lever on the respective diagonnally opposed sides with respect to and along the steering-wheel post.

SUMMARY OF THE INVENTION

Thus, this invention has as its object to provide a changespeed maneuvering apparatus in a vehicle provided with a steering-wheel apparatus including a generally upright steering-wheel post, of such type having an upright main change-speed maneuvering shaft assembly on one lateral side of the steering-wheel post, and having on the other lateral side of the steeringwheel post another upright actuation shaft such for instance as a forward-and-rearward running-travel shiftover shaft, the maneuvering apparatus being characterized in that a lower portion of the last-mentioned actuation shaft is utilized as pivotal support means for rotatably fitting thereon interlocking levers which function to operatively connect the main changespeed maneuvering shaft to the drive power transmission mechanism.

Another object of this invention is to provide a changespeed maneuvering apparatus of the construction generally the same as mentioned above in a vehicle having a hand-operated acceleration lever, wherein this acceleration lever and a main change-speed lever are disposed on one and the same lateral side of the steering-wheel post and close to each other.

Still another object of this invention is to provide a change-speed maneuvering apparatus of the construction generally the same as mentioned above, wherein the said forward-and-rearward running-travel shiftover shaft is adapted to actuate a forward-and-rearward running-travel shiftover apparatus which is interposed between the vehicle engine and a main change-speed apparatus and which is of a gearing type making use of gears fitted on shafts of a secondary change-speed mechanism such for instance as a PTO-change-speed mechanism.

According to this invention, interlocking levers functioning to operatively connect the said main change-speed maneuvering shaft with the power transmission mechanism are mounted on the said actuation shaft, particularly the forward-and-rearward running-travel shiftover shaft, in a pivotal manner, thus rotatably relative thereto.

Consequenctly, it is hereby possible to advantageously reduce the piece number of the component parts conventionally required for this kind of change-speed maneuvering apparatus, thus to make the work easy both for the manufacture and for the maintenance.

Besides, since it is possible according to this invention to alternatively selectively maneuver the hand-operated acceleration lever and the main change-speed lever, simply with one single operator's hand as for instance the right hand, it is thus possible, at turning round the tractor of the like, to effect the speed changing quite rapidly, with the remaining left hand constantly gripping the steering wheel.

It still further is possible, according to this invention, with one hand as for instance the right hand keeping on gripping the steering wheel thus retaining the secure steering, to easily and conveniently effect shifting over the forward and rearward running travels with the remaining left hand, and this is of particular practical value and advantage at turning round the tractor or the like.

Still further objects and advantages of this invention will be apparent from the detailed description to follow hereunder.

BRIEF DESCRIPTION OF THE DRAWINGS

The drawings show, by way of example, an embodiment of this invention as applied to a tractor, in which:

FIG. 4 is a sectional view taken on a plane per line A—A in FIG. 1;

FIG. 6 is a sectional view taken on a plane per line C—C in FIG. 5;

FIG. 7 is a bottom view of a steering box;

DETAILED DESCRIPTION OF THE PREFERRED EMBODIMENT

Figure 1:
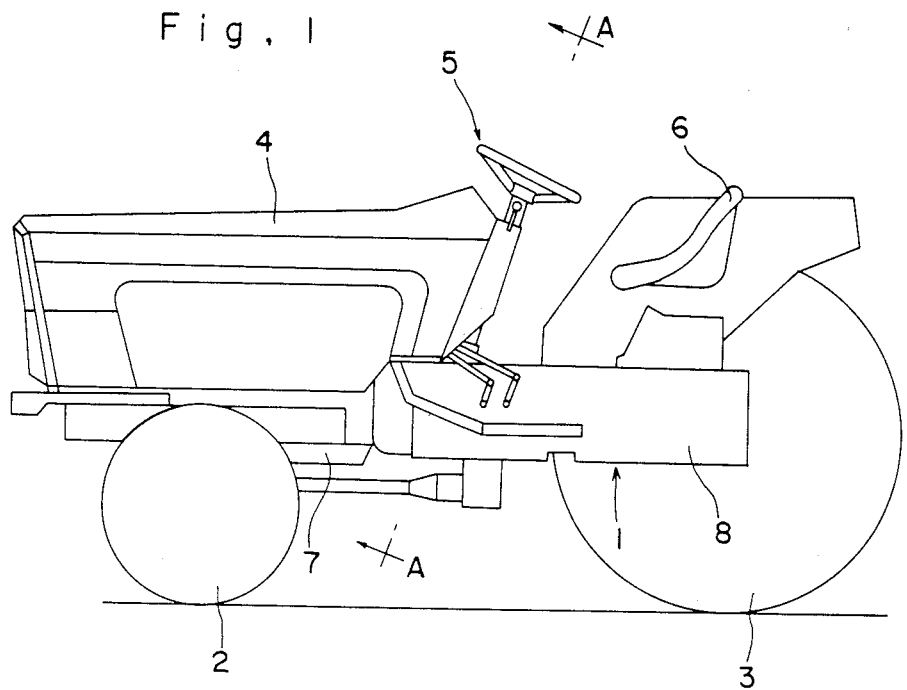
FIG. 1 is an overall side elevation of the tractor.

Seen as shown in FIG. 1 are: at 1 generally a tractor vehicle body, at 2 a front wheel, at 3 a rear wheel, at 4 a bonnet, at 5 generally a steering-wheel apparatus and at 6 an operator's seat.

The tractor vehicle body 1 has, as its essential parts, an engine 7 and a transmission case 8. Shown in FIG. 2 at 9 is a forward-and-rearward running-travel shiftover apparatus and at 10 generally a main change-speed apparatus, and they are accommodated in the transmission case 8. The forward-and-rearward running-travel shiftover apparatus 9 is interposed in between a clutch 11, which is downstream of the engine 7 in the power transmission line, and a main shaft 12. The tractor is caused to run forward and rearward by means of maneuvering the forwardand-rearward running-travel shiftover apparatus 9. The main change-speed apparatus 10 consists essentially of: gears 13–16 on the main shaft 12; idling rotation gears 18–21 which are fitted for free idling rotation on a change-speed shaft 17 and which are in constant meshing with the gears 13–16; and shifters 22,23 which respectively selectively connect either one of the respective pairs of the idling rotation gears 18–19 and 20–21 in driving engagement to the change-speed shaft 17. As is apparent, there are provided shift forks on fork shafts for engaging with the shifters 22,23. Shown in FIG. 3 at 25,26 are lever shafts, piercing through and supported on a lateral wall of the transmission case 8. Shift levers are carried on the lever shafts 25,26 at inner ends, and are respectively engaged with the shift forks. On outer ends of the lever shafts 25,26 there are mounted levers 27,28 so that the respective shifters 22,23 are maneuverable by means of these levers 27,28. The change-speed shaft 17 is operatively connected to a drive shaft 32 via a transmission shaft 29 and gears 30,31. The drive shaft 32 is in turn adapted to drive the front and rear wheels 2,3 via proper intermediaries such as differentials.

Referring also to FIGS. 4–7, the steering-wheel apparatus 5 includes a steering wheel 33 provided with a steering-wheel shaft 34 as is fixed at its upper end to the steering wheel 33, and with a steering-wheel post 35 overlapping said steering-wheel shaft 34. The apparatus 5 further includes a steering box 36 on to which a lower end of the steering-wheel post 35 is fixed and within which the steering-wheel shaft 34 interlockingly engages with a movement-transmitting mechanism. The steering box 36 is fixed to an approximately central portion, in the fore-and-aft direction, of the vehicle body 1, and it is by means of this steering box 36 that the steering-wheel post 35 is supported. A cover 37 attached from behind to a rear end of the bonnet 4 is provided for overlapping the steering-wheel post 35 which protrudes upwards piercing a maneuvering panel 38 attached to an upper end of the cover 37. On the upper righthand side of the steeringwheel apparatus 5 there are disposed both a hand-operated acceleration lever 39, protruding to the righthand lateral side from an upper portion of the maneuvering panel 38, and a main change-speed lever 40 protruding from inside the cover 37 to the righthand lateral side thereof. On the upper lefthand side of the steering-wheel apparatus 5 there is disposed a forward-and-rearward running-travel shiftover lever 41 protruding to the lefthand lateral side slantly upwards from inside the cover 37.

Figure 3:
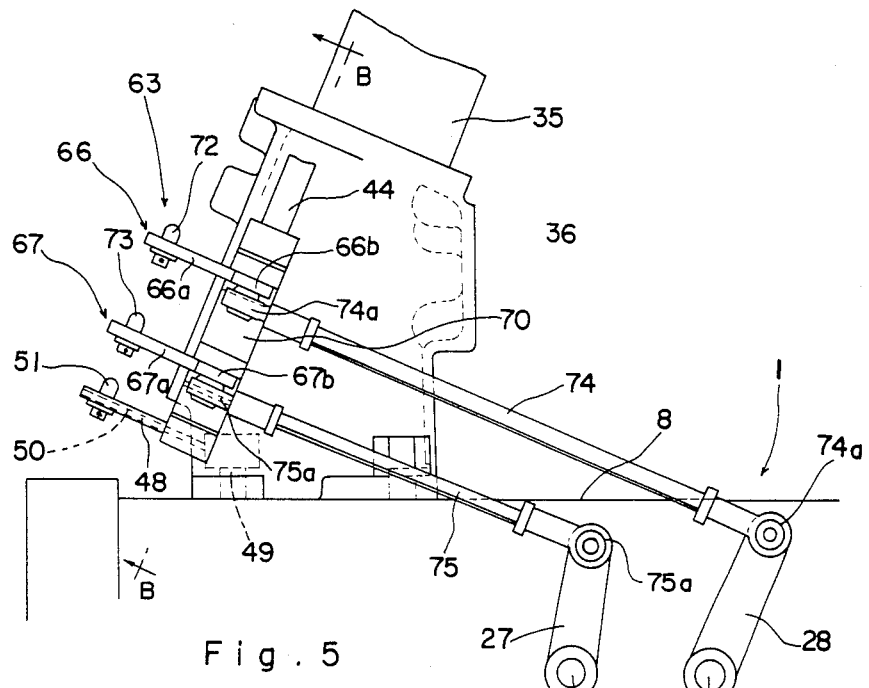
FIG. 3 is a side elevation of the parts essential to this invention.
Figure 5:
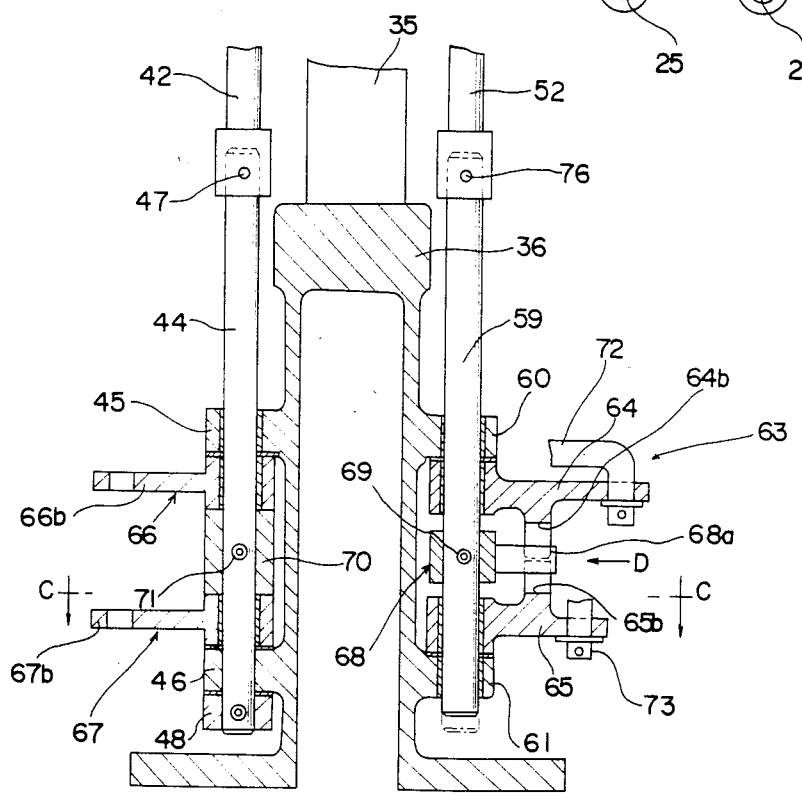
FIG. 5 is a sectional view, partly in development, taken on a plane per line B—B in FIG. 3.
Figure 9:
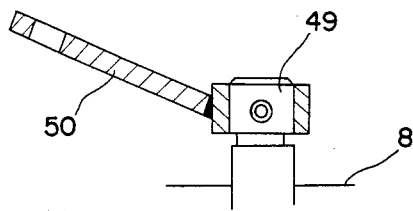
FIG. 9 is a sectional view taken on a plane per line E—E in FIG. 6.

Referring to FIGS. 4 and 5, the forward-and-rearward runningtravel shiftover lever 41 is fixed to an upper end portion of an upper actuation shaft 42 which is disposed on the lefthand lateral side of the steering-wheel post 35, in parallel thereto, with its upper portion supported for free rotation by means of a bracket 43 annexedly affixed to an upper portion of the steering-wheel post 35. Shown at 44 is a lower actuation shaft disposed on the lefthand lateral side of the steering box 36, in parallel thereto, and it pierces through a pair of upper and lower support lugs 45, 46 protruding to the lefthand lateral side from a front portion of the steering box 36, for free relative rotation in the lugs 45,46. The lower actuation shaft 44 is fittedly engaged, at its upper end, with a lower end portion of the upper actuation shaft 42, and is consolidatedly connected thereto, so as to prohibit relative rotation, by means of a pin 47. To a portion of the lower actuation shaft 44, beneath the lower support lug 46, there is fixed a first actuation shaft 48 protruding forwards. Shown at 49 in FIGS. 3 and 9 is a forward-and-rearward runningtravel shiftover shaft which is interlocked with the forwardand-rearward running-travel shiftover lever 41, and it protrudes to inside the steering box 36 from inside the transmission case 8 and is rotatable. To an upper portion of the shiftover shaft 49 there is fixed a second actuation arm 50 protruding forwards through a window aperture 36a defined in a front wall portion of the steering box 36. Both the actuation arms 48,50 are interlockedly interconnected by means of a rod 51.

Figure 10:
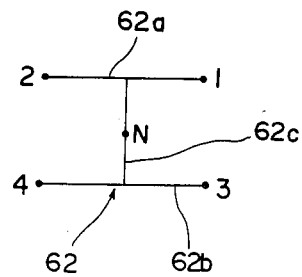
FIG. 10 is a schematic diagram showing course paths along which a main change-speed lever is maneuvered.

Seen at 40a in FIG. 4 is a bifurcate portion of the main change-speed maneuvering shaft 52 and a support portion 53a protruding upwardly of a support member 53, and is pivoted respectively thereon by means of bolts 54, 55. The upper change-speed maneuvering shaft 52 is disposed on the righthand lateral side of the steering-wheel post 35, approximately in parallel thereto, with its upper portion supported on the support member 53 which is fixed to an upper portion of the steering-wheel post 35, for free sliding in its axial direction, namely approximately up-and-down direction, and also for free rotation about its axis. To a portion of the upper change-speed maneuvering shaft 52, below the support member 53, there is fixed a washer 56. Between an upper end of the support member 53 and a tip end portion of the upper change-speed maneuvering shaft 52 and between a lower end of the support member 53 and the washer 56 there respectively are fitted coiled springs 57,58 in resilient compression helically around the shaft 52. Thus, the upper change-speed maneuvering shaft 52 is urgedly held in its neutral position by means of the resilient compression force of the springs 57,58. Shown at 59 is a lower change-speed maneuvering shaft disposed on the righthand lateral side of the steering box 36, in parallel thereto, and it pierce through, and is supported as fitted in, a pair of upper and lower support lugs 60,61 protruding to the righthand lateral side from a front portion of the steering box 36, for free sliding in its axial direction, namely approximately up-and-down direction, and also for free rotation about its axis. The shaft 59 is fittedly engaged, at its upper end, with a lower end portion of the upper change-speed maneuvering shaft 52, and is consolidatedly connected thereto by means of a pin 76. Accordingly, the main changespeed lever 40 is capable respectively of its up-and-down maneuvering about the bolt 55 and of its force-and-aft maneuvering about the upper change-speed maneuvering shaft 52, whereby the upper and the lower change-speed maneuvering shafts 52,59 move up and down as well as rockingly rotate, in interlocking with these respective maneuverings. As seen in FIG. 10, it is supposed that the maneuvering course paths of the main change-speed maneuvering lever 40 are generally H-shaped as lying sidelong, as viewed sideways, consisting of a first path 62a and a second path 62b, disposed in up and down relationship with each other and both extending in fore-and-aft direction, as well as a third path 62c interconnecting central portions of both the paths 62a, 62b. Here, front and rear end portions of the first path 62a are set as the respective change-speed positions corresponding to the first speed and the second speed, while front and rear end portions of the second path 62b are set as the respective change-speed positions corresponding to the third speed and the fourth speed, and a central position, in the up-and-down direction, of the third path 62c is set as the neutral position.

The main change-speed lever 40, as one party, is on the righthand side of the steering-wheel post 35, while the levers 27,28, as the other party, are on the left hand side of the transmission case 8, and these two parties are operatively interconnected by means essentially of a selection mechanism 63 provided in the vicinity of the lower portion of the steeringwheel post 35. The selection mechanism 63 comprises: respective pairs of an upper and a lower interlocking pieces 64,65 and of an upper and a lower interlocking levers 66,67; and ancillary members including an engagement piece 68.

Figure 8:
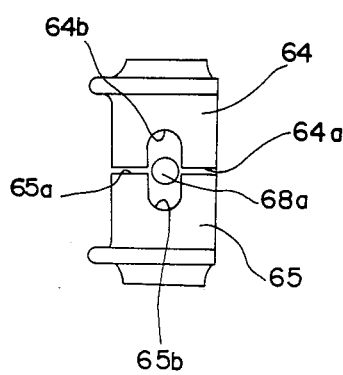
FIG. 8 is a fragmentary side elevation as viewed per arrow D in FIG. 5.

Referring to FIGS. 5 and 6, the upper and lower interlocking pieces 64,65 have their base portions fitted on the lower changespeed maneuvering shaft 59 respectively at an upper and a lower portions thereof in between the upper and lower support lugs 60,61, in a fashion for free relative rotation but adapted to protrude forwards when the lever 40 is in its neutral position. Referring also to FIG. 8, in intermediate portion, in longitudinal direction, of the upper and lower interlocking pieces 64, 65, on the side of mutually opposed surfaces, there are defined restraint portions 64a,65a respectively protruding to each other in arcuate form of a circle of the same radius, with the lower change-speed maneuvering shaft 59 as the center. On account that these restraint portions 64a,65a are thus made up in such up-and-down opposed relationship, the movement of the upper and lower interlocking pieces 64,65 in the axial direction, with respect to the lower change-speed maneuvering shaft 59, is blocked. Central portions of the restraint portions 64a,65a, in the peripheral direction, there are defined recesses 64b,65b in U-shaped sectional form. At the neutral position of both the interlocking pieces 64,65, these recesses 64b,65b are then opposed up and down.

As is clear from FIG. 5, the engagement piece 68 has its base portion engagedly fitted on a central portion, in between the upper and lower interlocking pieces 64,65, of the lower change-speed maneuvering shaft 59, and is fixed thereto by means of a pin 69. The engagement piece 68 has a protrusion 68a of a round pin form, and at the neutral position of the main changespeed lever 40, a tip end of the protrusion 68a is then kept, as shown in FIG. 8, in a state engaging with both the recesses 64b,65b.

Base portions of the upper and lower interlocking levers 66,67 are engagedly fitted on the lower actuation shaft 44 at an upper and a lower portions thereof in between the upper and lower support lugs 45,46, for free relative rotation, and in between these base portions there is engagedly fitted, also on the shaft 44, a distance collar 70 for defining the proper location and it is fixed thereto by means of a pin 71. Referring to FIGS. 3 and 6, the upper and lower interlocking levers 66,67 are bellcranks of L-shaped form consisting of first lever portions 66a,67a, protruding forward, and second lever portions 66b,67b, protruding towards the lefthand lateral side. The respective first lever portions 66a,67a are operatively interconnected via the respective upper and lower interlocking pieces 64,65 and rods 72,73. The respective second lever portions 66b, 67b are operatively interconnected with the respective levers 28,27 via rods 74,75 having ball-joint portions 74a,75a at both end portions.

The structure described above functions as follows: Describing first the change-speed maneuvering of the main changespeed apparatus 10 by means of the main change-speed lever 40, it is basically supposed, as has already been described, that when the main change-speed apparatus 10 is in the neutral state, then the main change-speed lever 40 is in the neutral position at the center of the third path 62c of the change-speed course paths 62, and the protrusion 68a is in engagement with both the recesses 64b,65b. For maneuvering the main change-speed apparatus 10 starting from this state, selection of the division of which one of the first/second speeds and the third/fourth speeds is first made by means of moving the main change-speed lever 40 to a respective junction of the third path 62c with either the first path 62a or the second path 62b by moving up or down the main changespeed lever 40. Then, the change-speed lever 40 is moved to the respective forward or rearward end portion either of the first path 62a or the second path 62b by rockingly rotating the main change-speed lever 40 forwards or rearwards. It is hereby possible to realize the change-speed maneuvering of the main change-speed apparatus 10 into any arbitrary speed of the first through fourth speeds.

Thus, for instance for maneuvering the main speed-change apparatus 10 into the first or second speed, the main changespeed lever 40 should be maneuvered to move downwards about the bolt 55, against the spring 58. Then, the upper and lower change-speed maneuvering shafts 52,59 are caused via the bolt 54 to slidingly move upwards. Accordingly, the engagement piece 68, which goes consolidatedly with the lower change-speed maneuvering shaft 59, is displaced upwards, so that the protrusion 68a gets clear off the recess 65b of the lower interlocking piece 65. Namely, the engagement piece 68 gets to such state engaging only with the recess 64b of the upper interlocking piece 64. When in this state the main change-speed lever 40 is maneuvered in rocking rotation forwardly or rearwardly, then the upper interlocking piece 64 is caused, via the upper and lower change-speed maneuvering shafts 52,59 and the engagement piece 68, to rockingly rotate and in consequence of this rocking rotation the upper interlocking lever 66 is caused via the rod 72 to rockingly rotate about the lower actuation shaft 44. In consequence of this rocking rotation of the upper interlocking lever 66, in turn, the lever 28 is caused via the rod 74 rockingly rotate forwardly or rearwardly, and thus the shifter 23 is caused, via the lever shaft 26 the shift lever and the shift fork, to slidingly move forwards or rearwards. In this way, the shifter 23 couplingly connects one of the idling rotation gears 20,21 to the change-speed shaft 17, meaning that the main change-speed apparatus 10 is thus set to the first speed or the second speed.

If the downwardly pressing force is here released from the main change-speed lever 40, then the protrusion 68a is caused to abuttingly bear on the flant surface portion of the restraint portion 65a of the lower interlocking piece 65, provided on either side of the recess 65b. Thus, there never occurs such phenomenon that the main change-speed lever 40 rockingly rotates upwards or so on account of the resilient compression force of the spring 58.

For maneuvering the main change-speed apparatus 10 into the third or fourth speed, the main change-speed lever 40 should first be maneuvered to move upwards about the bolt 55. The remaining steps are similar to those described hereinabove.

For restoring the main change-speed lever 40 from any active change-speed position to the neutral position, when same is brought to the junction of either the first path 62a or the second path 62b with the third path 62c, then the main change-speed apparatus 10 is thereby set in its neutral state. When the maneuvering force is here released from the main changespeed lever 40, then the upper and lower change-speed maneuvering shafts 52,59 are restored, by the then-predominant resilient compression force of either one of the springs 57,58, to the appropriate position, and thus the main changespeed lever 40 is assuredly restored to the appropriate neutral position, shown at N in FIG. 10, at the center of the third path 62c.

On the other hand, in the case where frequent repeating of shifting over the forward and rearward running travels is required, for instance as in the front loader work, then the forward-andrearward running-travel shiftover lever 41 should be maneuvered in rocking rotation forwards and rearwards. The forward-andrearward running-travel shiftover shaft 49 is hereby caused, via thefirst actuation arm 48, the rod 51 and the second actuation arm 50, to rockingly rotate accordingly, and thus the forwardand-rearward running-travel shiftover apparatus 9 shifts over between the forward running travel and the rearward running travel.

As is now apparent from the foregoing, since the upper and lower interlocking levers 66,67 are mounted on the lower actuation shaft 44 in a pivotal manner thus for free rotation relative thereto, there is no need here of many parts such as brackets, shafts and the like as have been required in the conventional structure, thus enabling to reduce the component piece number. Besides, since the upper and lower interlocking levers 66,67 are disposed as described hereinabove on the lower actuation shaft 44, more specifically near a lower portion of the steering-wheel apparatus 5, it is now possible to compactly and neatly gather up the portions around the steering box 36, of the main change-speed maneuvering apparatus and the forwardand-rearward running-travel shiftover apparatus.

Figure 2:
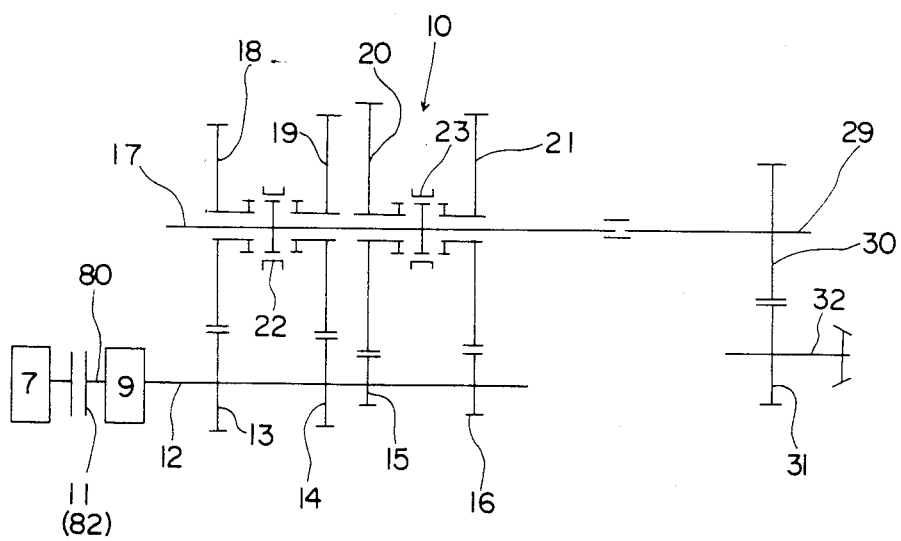
FIG. 2 is a schematic diagram showing how the drive power is transmitted.
Figure 12:
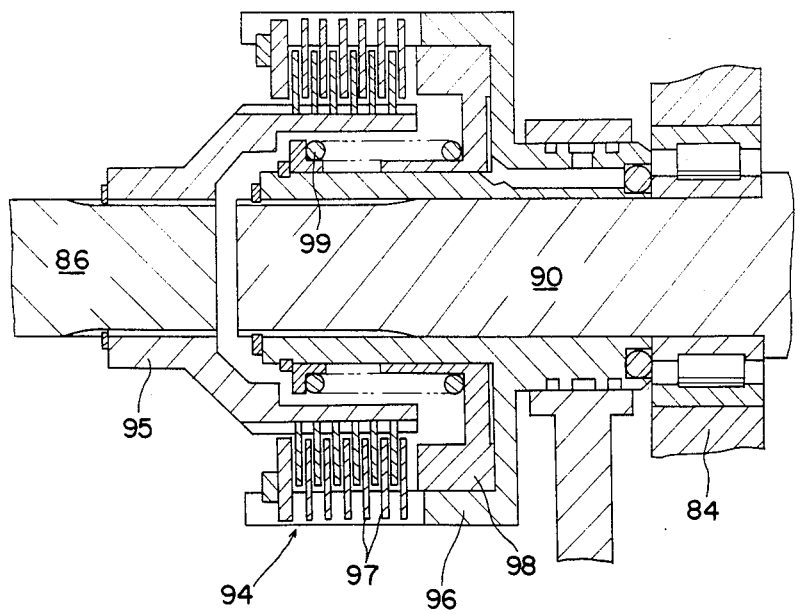
FIG. 12 is an elongated longitudinal sectional view of an oilhydraulic clutch.
Figure 11:
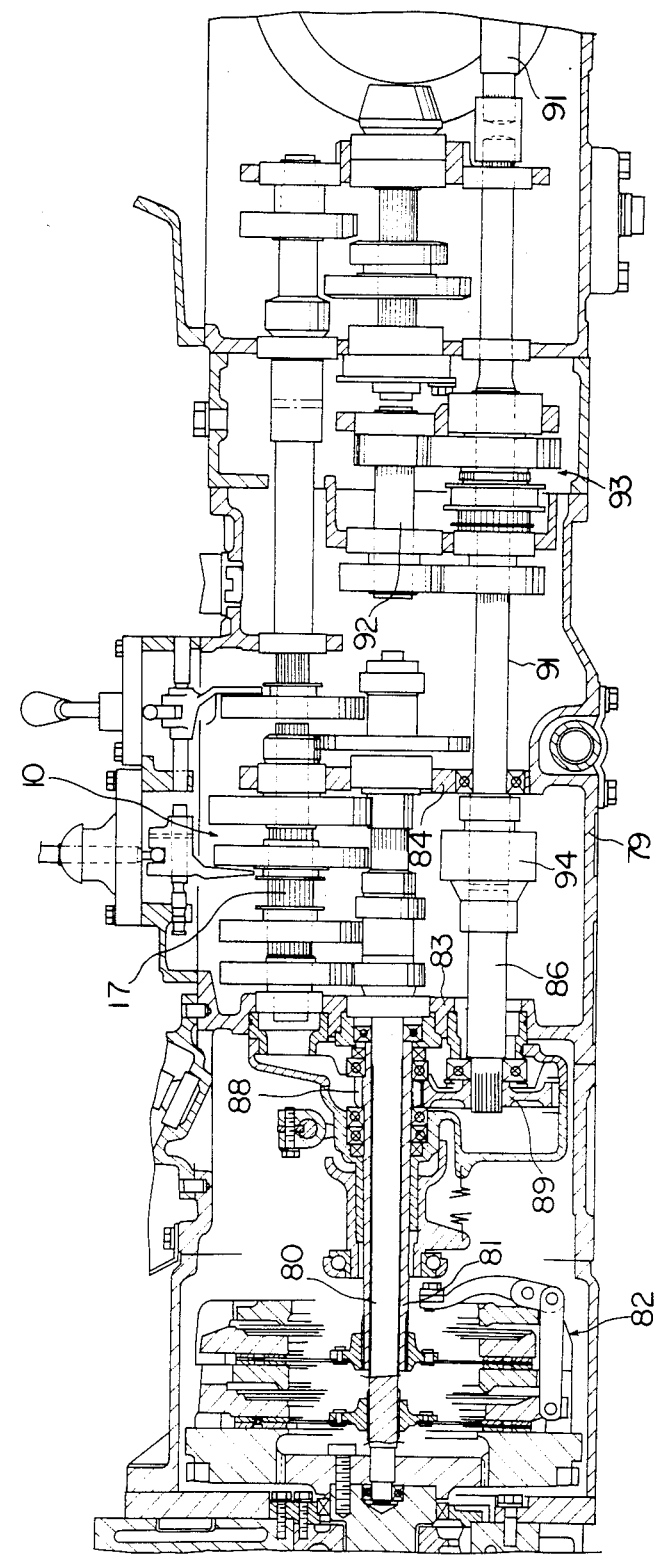
FIG. 11 is a vertical longitudinal sectional view of transmission mechanisms.

Shown in FIG. 11 is a transmission structure within a trnsmission case 79 supposed to be incorporated in a tractor, somewaht different from the transmission case 8 described hereinbefore as accommodating the transmission structure shown in FIG. 2. Shown here in FIG. 11 at 80 is a running-travel-system main shaft and relatively rotatably fitted thereon at 81 thus to make up a double shaft construction is a hollow tubular shaft which is a PTO-system main shaft, and they are operatively connected to the primary mover side via a double clutch 82. More particularly, the double shaft namely these two main shafts 80,81 are disposed to extend in fore-and-aft direction at a central height level portion of the transmission case 79, as supported on partition walls 83,84. The running-travel-system main shaft 80 integrally extends far rearwards then the PTO-system main shaft 81, and in juxtaposition to this integral extension there are respectively disposed: a change-speed shaft 17 above same and a first runningtravel-system main shaft 80 and the change-speed shaft 17, is a main change-speed apparatus generally designated at 10. The first PTO shaft 86 has its fore end portion supported on the partition wall 83, and is operatively connected to the PTO-system main shaft 81 via gears 88,89 forwardly of the partition wall 83. Rearwardly of the first PTO shaft 86 there are disposed, in continuation thereto, a second PTO shaft 90 and a third PTO shaft 91. Provided in between the second PTO shaft 90 and a changespeed shaft 92 thereabove is a PTO change-speed apparatus generally designated at 93. The first PTO shaft 86 has its rear end opposed to a front end of the second PTO shaft 90, in between the two partition walls 83,84, and there is provided in between these two shafts 86,90, in good use of the deadspace below the main change-speed apparatus 10, an oilhydraulic clutch 94 which clutches on and off the drive power transmission. The oilhydraulic clutch 94 comprises, as shwon in FIG. 12: a primary mover body 95 and a follower mover body 96, splinedly connected respectively to the first and second PTO shafts 86,90; clutch plates 97 interposed in between the primary mover body 95 and the follower mover body 96; a piston 98 adapted to push the clutch plates 97; and a spring 99 for restoring action.

With the transmission structure as above, it is possible to quite easily effect grass-reaping work and the like, since it is capable of clutching on and off the drive power transmission to the second PTO shaft 90, during the running travel, by means of the oilhydraulic clutch 94, retaining the clutch 82 without being clutched off.

Figure 13:
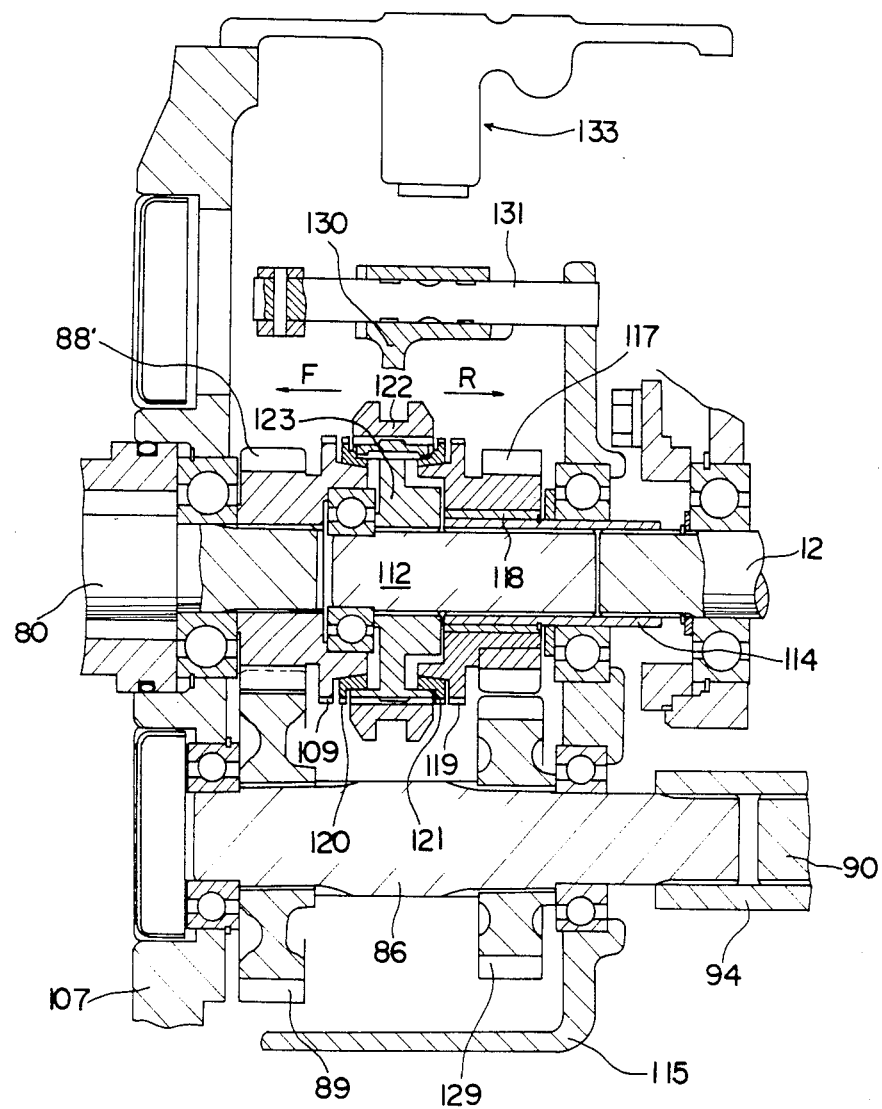
FIG. 13 is a vertical longitudinal sectional view of a forward-and-rearward running-travel change-speed apparatus.

FIG. 13 shows in detail the structure of a preferred embodiment of the forward-and-rearward running-travel shiftover apparatus 9 schematically shown as a block in FIG. 2 and described as maneuverable by means of the forward-and-rearward running-travel shiftover lever 41. This shiftover apparatus 9 is supposed to be incorporated in the transmission structure shown in FIG. 11 in replacement of the gears 88,89 and the ancillary parts therearound. In the case of this replacement, the so-far described double clutch 82 may accordingly be replaced by a single clutch, and the main shaft may also simply be a single shaft instead of the double shaft.

Shown in FIG. 13 at 130 is a shift fork slidably fitted on a fork shaft 131. Schematically designated generally at 133 is a maneuvering mechanism in which the shiftover shaft 49 as shown in FIGS. 3 and 9 is uprightly fitted, and by means hereof the shift fork 130 is caused to slide either along arrow F or R. Shown at 107 is a clutch-housing wall, and at 115 is a partition wall within the transmission case 79.

A short shaft 112 lies on the extension of the main shaft 80, coaxially therewith, and is operatively connected to an input shaft 12 as to designated also in FIG. 2. Designated at 86 just as in FIG. 11 is the first PTD shaft, but in this instance it has gears 89 and 129 both fixedly fitted thereon. A drive gear 88' is fixedly fitted on the main shaft 80, in meshing with the gear 89. Shown at 114 is a tubular joint shaft, and is in operative gearing connection with the above-mentioned gear 129 via a non-illustrated intermediary gear.

Shown at 109 are coupling engagement portions respectively of the gears 88' and 117, and mating coupling engagement portions to cooperate in synchronous concert therewith are shown respectively at 120 and 121. A coupler 123 is interposed in between the two gears 88' and 117, as is splinedly consolidated with the short shaft 112 as to rotation, and has its peripheral gearing teeth adapted to alternatively selectively be meshed with either one of the said coupling engagement portions 109 and 119 indirectly via a shifter 122.

If the shifter 122 is manevered to slidingly move in the direction of the arrow F, then the drive gear 88' is coupled with the input shaft 12 via the synchronous coupling engagement portion 120 and so forth, and thus the input shaft 12 is driven in rotation in the rotary sense the same as the main shaft 80 illustrated in FIGS. 2, 11 and 13. It is supposed here that the forward-running speed changing in sixteen steps is possible by means of the main change-speed apparatus 10 and also a superreduction mechanism and an auxiliary change-speed mechanism, and thus that the forward-running speed changing in eight steps is possible if the power is transmitted without the superreduction mechanism.

Further considering in this instance the side of the first PTO shaft 86, it is supposed, in view that the gear 89 is in operative gearing meshing with the drive gear 88', that the speed changing in four steps is possible by means of the PTO change-speed apparatus 93 and also the afore-mentioned auxiliary change-speed mechanism.

On the other hand, if the shifter 122 is maneuvered to slidingly move in the direction of arrow R, then the reversing input gear 117 is coupled with the input shaft 12 via the synchroous coupling engagement portion 121 and so forth, and thus the input shaft 12 is driven in rotation in the rotary sense opposite to the main shaft 80, since the first PTO shaft 86 is driven just the same as described hereinabove via the drive gear 88' and the mating gear 89 but the other gear 129 on the first PTO shaft 86 and the reversing input gear 117 are in operative gearing connection by the non-illustrated intermediary gear as mentioned hereinbefore. It is thus supposed here, similar to the case of the forward running travel described hereinbefore, that the rearward-running speed changing either in sixteen or eight steps is possible. It is thus made quite convenient to effect a work requiring frequently shifting over the forward and rearward running travels by means of slidingly shifting over the shifter 122, for instance as the loading work with a tractor, and also to effect a reaping work or the like while traveling rearwards.

It should be noted here, that while the sliding shiftover of the shifter 122 enables the shiftover of the forward and rearward running travels, it never affects any a bit the continuous driving of the PTO change-speed apparatus 93 shown in FIG. 11 and described hereinbefore.

Such shifting over of the forward and reverse rotary driving sense by means of the shifter 122 makes the overall structure quite simple and compact, contributing thereto is also the good utilization of the compact parts of the PTO change-speed apparatus 93 dually for effecting the reversing; and convenient and light maneuvering is possible by means of forward-and-rearward running-travel shifter lever 41 disposed near the steering-wheel post.

We claim:

1. A change-speed maneuvering apparatus for a vehicle having an upright steering-wheel apparatus and a change-speed apparatus, comprising:
   a change-speed maneuvering shaft means arranged on one lateral side of and along said steering-wheel apparatus;
   an actuation shaft means arranged on the other lateral side of and along said steering-wheel apparatus; and
   interlocking means for operatively connecting said change-speed maneuvering shaft means with the change-speed apparatus, said interlocking means including lever means supported on said actuation shaft means for relative rotation with respect thereto.

2. The apparatus of claim 1 wherein said actuation shaft means is operatively connected to a forward and rearward switching mechanism of the vehicle and is maneuvered by means of a forward and rearward switching lever.

3. The apparatus of claim 1 wherein said change-speed maneuvering shaft means is adapted to be maneuvered by a main change-speed lever for rocking and up-down movements thereof.

4. The apparatus of claim 3 wherein said interlocking means further includes second lever means rotatably mounted on the change-speed maneuvering shaft means and link means interconnecting said lever means and second lever means, said change-speed maneuvering shaft means including engagement means selectively engageable with the second lever means.

5. The apparatus of claim 4 wherein said lever means comprises first and second lever members operatively connected to first and second change-speed shift means of the change-speed apparatus, and said second lever means comprises third and fourth lever members operatively connected to said first and second lever members by means of said link means, said engagement means being selectively engageable with said third or fourth lever members.

6. The apparatus of claim 5 wherein said engagement means is selectively engageable with said third or fourth lever members when the change-speed manuevering shaft means is moved upwardly or downwardly by the main change-speed lever.

7. The apparatus of claim 6 wherein said change-speed maneuvering shaft means is resiliently urged by spring means to a neutral position where the engagement means engages with both of the third and fourth lever members.

8. The apparatus of claim 7 wherein said main change-speed lever is adapted to be maneuvered along substantially H-shaped paths, said paths comprising a first path where the third lever member is rotated with the change-speed maneuvering shaft means to shift the first change-speed shift means, a second path where the fourth lever member is rotated with the change-speed maneuvering shaft means to shift the second changespeed shift means and a third path interconnecting center portions of said first and second paths where the change-speed maneuvering shaft means is upwardly or downwardly moved to selectively engage with the third or fourth lever member, said third path defining said neutral position at a center portion thereof.

9. The apparatus of claim 8 further including a hand-operated acceleration lever, said acceleration lever and the main change-speed lever are arranged on the same lateral side of the steering-wheel apparatus ansd close to each other.

10. The apparatus of claim 9 wherein said forward and rearward switching mechanism comprises a drive gear carried on a main shaft operatively connected to an engine, an input shaft coaxially aligned with said main shaft and operatively connected to a main change-speed mechanism, a reversing gear rotatably mounted on a short shaft operatively connected to said input shaft, a shifter for selectively connecting and disconnecting the input hsaft with said drive gear or reversing gear, a power take-off shaft disposed laterally of the main shaft and in parallel to the short shaft, a gear carried on said power take-off shaft to mesh with the drive gear, and a gear carried on said power take-off shaft to mesh with the reversing gear through a intermediary gear.

* * * * *